Nov. 14, 1944.    W. W. LOWTHER    2,362,493
APPARATUS FOR SILENCING AND SUPERCHARGING ENGINE INTAKE
Filed April 17, 1942
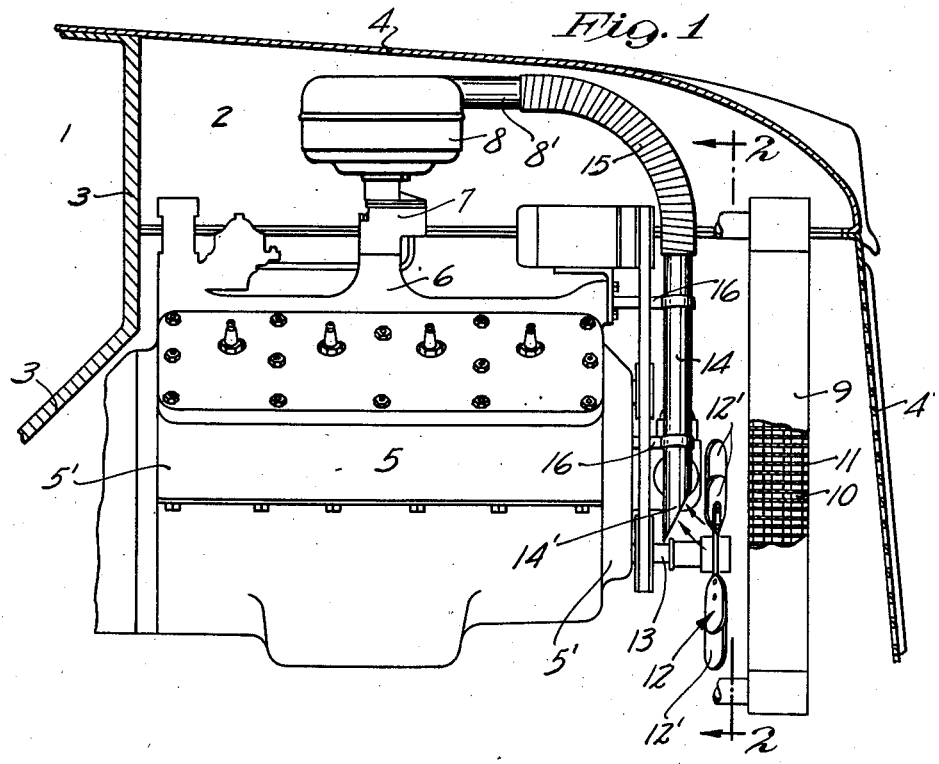
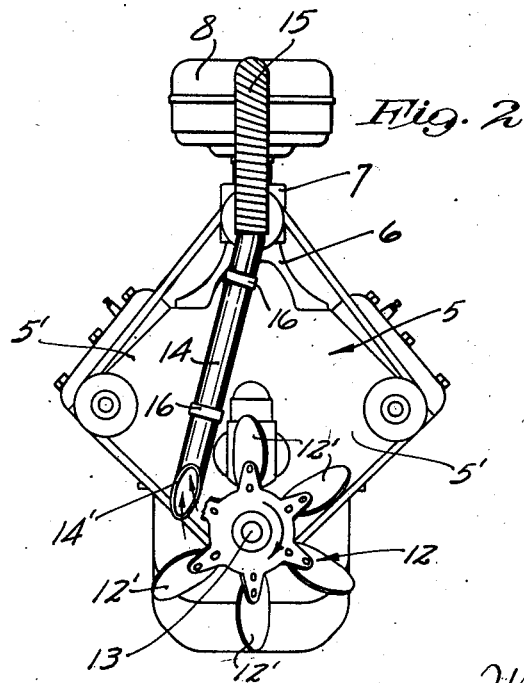
Inventor
Wilfred W. Lowther
By his Attorneys Patented Nov. 14, 1944

2,362,493

UNITED STATES PATENT OFFICE 2,362,493

APPARATUS FOR SILENCING AND SUPERCHARGING ENGINE INTAKES

Wilfred W. Lowther, Minneapolis, Minn., assignor, by mesne assignments, to Harry J. Doherty, Minneapolis, Minn.

Application April 17, 1942, Serial No. 439,334

4 Claims. (Cl. 123—119)

My present invention relates to internal combustion engines and particularly to the handling of the air intakes thereof and provides an improved arrangement whereby silencing of the engine intake and supercharging of the engine cylinders is simply and inexpensively accomplished.

In accordance with the present invention, I extend the air intake conduit of a vehicle's engine toward and outwardly terminate the same in an intake mouth that is located in the space between the wall of the engine, usually the front wall thereof, and the engine-driven cooling fan thereof so that the intake mouth of the air intake conduit is subject to the relatively high pressure built up by the fan in the space therebetween and the engine and so that the sound waves, which are outwardly projected through the intake conduit, are directed through the revolving fan blades. This arrangement has been found to work out particularly well when the engine is faced forwardly and wherein the fan receives its air through an air pervious radiator located forwardly of the fan.

As is well known, cooling fans of most internal combustion engines are of the type involving a plurality of radially extended circumferentially spaced blades with surfaces that are cross-sectionally oblique to the axis of the fan and which discharge air therefrom in a direction obliquely to the axis of the fan and the adjacent engine wall. As an important feature of the present invention, I dispose the intake end or mouth of the air intake conduit, which is located back of the fan, obliquely to the axis of the fan in the same direction that the fan blades are cross-sectionally oblique to the axis thereof at the time they pass the intake mouth so that the intake mouth is actually disposed substantially at right angles to the direction of air discharge from the fan blades as they pass the intake mouth.

Preferably, also I provide the intake mouth by cutting the end of the intake tube diagonally of the axis of the intake tube so as to increase the area of the intake mouth to the maximum for a tube of given diameter.

Not only does the arrangement briefly defined above produce a remarkable degree of silencing or effective silencing of air intakes, but it also produces sufficient supercharging effect to provide a remarkable increase in engine performance including a decided increase in gasoline mileage. Of course, it will be understood that the intake noise, which is effectively reduced or eliminated by means of this invention, is that produced by intermittent opening and closing of the engine's intake valves.

The above and other highly important objects and advantages of the invention will be made more fully apparent from the following specification, claims, and appended drawing.

Referring to the drawing:

Fig. 1 is a view, partly in side elevation and partly in vertical section and with some parts broken away, showing the invention incorporated within the engine compartment of an automobile and connected to an internal combustion engine of the well known Ford V-8 type; and Fig. 2 is a front elevation of the engine showing the same removed from the engine compartment.

Fig. 1 may be assumed to be illustrative of a Ford V-8 automobile and with particular reference to this figure, the passenger compartment of the automobile is indicated by the numeral 1, the engine compartment by the numeral 2, the floor and dashboard by the numeral 3, the hood forming the sides and top of the engine compartment by the numeral 4, and the usual radiator grill by the numeral 4'. This grill forms the front wall of the engine compartment. The engine of Figs. 1 and 2, being of the well known Ford V-8 type, will be but briefly described. This engine is indicated as an entirety by 5, the opposite cylinder blocks thereof by 5', the air intake manifold by 6, the usual carburetor by 7, a suitable air cleaner by 8, an air cleaner intake neck by 8', the engine cooling radiator by 9, the radiator tubes by 10, the radiator fins by 11, the engine cooling fan by 12, and the engine's crank shaft by 13.

The cooling fan 12 is of the usual air-screw type made up of a plurality of radially extended circumferentially spaced blades 12' and is mounted fast on the end of the engine's crank shaft 13 just back of the radiator 9 and in closely spaced relation to the front wall 5' of the engine. The blades of the fan 12 are pitched to move air backwardly through the radiator and into the space between the fan and the wall 5' under clockwise rotation of the fan and discharge air more or less spirally into the space between the fan and the front engine wall.

In accordance with the preferred embodiment of the invention herein illustrated, I extend the engine air intake conduit, which is formed in part by the manifold 6, carburetor 7, air cleaner 8, and air cleaner neck 8', to a point just back of the fan 12 and dispose the intake end or mouth thereof at right angles to the direction of flow of air from the fan blades as they pass the intake end or mouth of the air intake conduit. In the preferred example illustrated, the air intake conduit is extended from the neck 8' by means of a substantially vertically disposed rigid conduit section 14 and an intermediate curved flexible section 15. In accordance with the preferred example illustrated, the diagonal disposition of the intake end of the conduit is provided by cutting the intake end of the tube off diagonally to the axis of the tube to provide a large area mouth 14' that is disposed substantially transversely to the line of air flow from the fan at that point and which is diagonally disposed with respect to the fan axis and adjacent engine wall in the same direction that the fan blades 12' are oblique to the fan axis and wall at the time they pass the mouth 14'.

By the simple expedient above described, the usual intake noise is rendered substantially inaudible and a relatively high degree of supercharging effect resulting in greatly increased engine performance and economy simultaneously effective. The silencing or effective silencing obtained would seem to be brought about principally by the breaking up of the sound waves by the rotating fan blades, and secondly, and to a smaller degree, by further baffling and breaking up of the sound waves as they pass through the tortuous passage of the radiator and grill.

On the other hand, the remarkably high degree of supercharging effect to the cylinders would appear to be attributable to the following, to wit: (a) the fact that the intake mouth of the intake conduit is located between the fan and adjacent baffle-acting engine wall, which latter sets up resistance to air flow causing a change in direction and consequent relatively high degree of pressure in this area; (b) the fact that the intake mouth is disposed substantially at right angles or transversely of the line of movement of the air from the blades of the fan as they pass the same and therefore offers a minimum amount of resistance to air entering the tube; and (c) the fact that the intake mouth of the conduit is set obliquely to the axis of the conduit so as to produce a maximum open area without actually expanding the cross-section of the intake tube.

Preferably and as herein illustrated, the entire intake mouth of the intake conduit is located in the space between the air delivery side of the fan and the baffle surface afforded by the front wall 5' of the engine.

In practice it has been found that two or more miles per gallon of gasoline are usually obtainable with a Ford car by the simple application of this invention.

What I claim is:

1. In a motor propelled vehicle, a passenger compartment, an engine compartment, an internal combustion engine, an engine-driven fan having its air delivery side in closely spaced parallel relation to one wall of the engine, and an air intake conduit communicating with the engine cylinders and outwardly terminating in an intake mouth, the entire intake mouth being located in the space between the air delivery side of the fan and the said adjacent wall of the engine, said fan comprising circumferentially spaced blades that discharge air into the space between the fan and adjacent engine wall in a direction obliquely to the axis of the fan and said adjacent wall, the said intake mouth of the intake conduit being set obliquely to the axis of the fan and to said engine wall in a direction substantially at right angles to the direction in which air is discharged from the fan blades as they pass the intake mouth.

2. In a motor propelled vehicle, a passenger compartment, an engine compartment, an internal combustion engine, an engine-driven fan having its air delivery side in closely spaced parallel relation to one wall of the engine, and an air intake conduit communicating with the engine cylinders and outwardly terminating in an intake mouth, the entire intake mouth being located in the space between the air delivery side of the fan and the said adjacent wall of the engine, said fan comprising circumferentially spaced blades that discharge air into the space between the fan and adjacent engine wall and have surfaces that are cross-sectionally oblique to the axis of the fan and said adjacent wall, and the said mouth of the intake tube being disposed obliquely to the axis of the fan and said wall in the same direction that the fan blades are oblique thereto when they are opposite said intake mouth.

3. In a motor propelled vehicle, a passenger compartment, an engine compartment, an internal combustion engine, a baffle surface, an engine-driven fan having its delivery side in closely spaced parallel relation to said baffle surface, and an air intake conduit communicating with the engine cylinders and outwardly terminating in an intake mouth, the entire intake mouth being located in the space between the air delivery side of the fan and the said baffle surface, said fan comprising circumferentially spaced blades that discharge air into the space between the fan and adjacent baffle surface in a direction obliquely to the axis of the fan and said adjacent baffle surface, the said intake mouth of the intake conduit being set obliquely to the axis of the fan and to said baffle surface in a direction substantially at right angles to the direction in which air is discharged from the fan blades as they pass the intake mouth.

4. In a motor vehicle, a passenger compartment, an engine compartment, an internal combustion engine, a baffle surface, an engine-driven fan having its air delivery side in closely spaced parallel relation to said baffle surface, and an air intake conduit communicating with the engine cylinders and outwardly terminating in an intake mouth, the entire intake mouth being located in the space between the air delivery side of the fan and the said baffle surface, said fan comprising circumferentially spaced blades that discharge air into the space between the fan and adjacent baffle surface and have surfaces that are cross-sectionally oblique to the axis of the fan and to said baffle surface, and the mouth of said intake tube being disposed obliquely to the axis of the fan and said baffle surface in the same direction that the fan blades are oblique thereto when they are opposite said intake mouth.

WILFRED W. LOWTHER.